United States Patent [19]

Johansson

[11] Patent Number: 5,178,825
[45] Date of Patent: Jan. 12, 1993

[54] FUEL BUNDLE AND SPACER UTILIZING TAPERED FUEL RODS

[75] Inventor: Eric B. Johansson, Wrightsville Beach, N.C.

[73] Assignee: General Electric Company, San Jose, Calif.

[21] Appl. No.: 800,295

[22] Filed: Nov. 29, 1991

[51] Int. Cl.⁵ .................................. G21C 3/34
[52] U.S. Cl. ........................ 376/438; 376/433; 376/439; 376/446
[58] Field of Search ............ 376/432, 433, 439, 438, 376/446, 430; 976/DIG. 73, DIG. 50

[56] References Cited

U.S. PATENT DOCUMENTS

| | | | |
|---|---|---|---|
| 2,968,601 | 1/1961 | Evans et al. | 376/433 |
| 3,604,100 | 9/1971 | Tindale | 29/433 |
| 3,719,560 | 3/1973 | Mayers et al. | |
| 4,129,477 | 12/1978 | Johansson et al. | 376/429 |
| 4,872,911 | 2/1983 | Cachera | 376/439 |

Primary Examiner—Donald P. Walsh
Assistant Examiner—Meena Chelliah
Attorney, Agent, or Firm—Robert R. Schroeder

[57] ABSTRACT

In a nuclear fuel bundle for a boiling water reactor, the prior art suggested concept of tapered fuel rods forming the bundle array is disclosed in a practical design including a fuel bundle and an improved associated spacer utilized in the upper two phase region of the fuel bundle. A tapered fuel rod is utilized having a large diameter bottom tube for holding corresponding large diameter fuel pellets at the fuel rod bottom, a smaller diameter top tube for holding correspondingly smaller diameter pellets at the top of the fuel rod, and a bell reducer situated between the large diameter lower fuel tube and the smaller diameter upper fuel tube. This bell reducer tapers from the large outside diameter of the lower fuel tube and the smaller outside fuel diameter of the upper fuel tube and forms a smooth transition between the large and small diameter sections of the fuel rod. An improved fuel rod spacer is disclosed for use with the upper and smaller tube portions of the fuel rods. This upper spacer defines a matrix of rod holding positions having sufficient dimension for enabling both the upper and smaller diameter tube and the lower large diameter tube to pass through the cells defined for each fuel rod. A spring having a relatively wide flexure range protrudes into each cell. When the fuel bundle is conventionally assembled, the spring in each cell biases the upper smaller diameter tubes in their designed side-by-side relation against stops defined at each cell. At the same time, the spring is provided with sufficient flexibility to allow the lower large diameter tube and the transition bell reducer to pass through the individual cells of the upper spacer. With the improved upper spacer, a fuel rod can be lifted vertically upward and out of the fuel bundle or replaced vertically downward into the fuel bundle.

10 Claims, 10 Drawing Sheets

FUEL BUNDLE AND SPACER UTILIZING TAPERED FUEL RODS

This invention relates to fuel bundles for boiling water nuclear reactors utilizing the prior art suggested concept of tapered fuel rods having relatively large diameter bottom tubes and relatively smaller diameter top tubes placed in the fuel rod array within nuclear fuel bundles. More particularly, a nuclear fuel bundle and improved upper fuel rod spacer for use within the fuel bundle is disclosed which enables tapered fuel rod removal from the top and replacement from the top of the fuel bundle.

SUMMARY OF THE PRIOR ART

Ueda Japanese Kokai Patent No. Sho 52-50498 of Apr. 22, 1977 discloses a fuel bundle having partial length fuel rods. These partial length fuel rods are arrayed is side-by-side relation so as to define large central voids in the center of fuel bundles within a boiling water reactor. The large central void defined by the partial length rods is in the upper two phase region of the fuel bundle and has the shape of a cone.

In a first embodiment of Ueda, the cone in the upper portion of the fuel bundle is filled with a correspondingly large central conical water rod. In a second—and apparently preferred embodiment of Ueda—the large central conical void is vacant. This large central conical void permits the discharge of steam within the fuel bundle.

The purpose of the design of Ueda is to provide a kind of fuel assembly that can suppress "output peak", that is the tendency of portions of the fuel rods in the upper two phase region adjacent the control rod to heat to levels approaching the thermal limit of the fuel rods. The function of the above mentioned disclosed designs "is characterized by the feature that the volumetric ratio of thermmoderator (water) to fuel is made to change in the axial direction in the channel box, so that the above-mentioned peak caused by the distribution of axial voids can be inhibited."

The Ueda disclosure continues. It points out that in addition to the conical voids, other expedients can be used. Specifically the suggestion is made as follows:

"In addition, similar effects as above can be achieved by using fuel rods with changed diameter in the axial direction, i.e., larger outer diameter of the fuel rods in the lower portion of the fuel assembly, and small diameter of the fuel rods in the upper portion of the fuel assembly." No practical design of the suggested fuel rods is disclosed.

SUMMARY OF THE INVENTION

In a nuclear fuel bundle for a boiling water reactor, the prior art suggested concept of tapered fuel rods forming the bundle array is disclosed in a practical design. This design includes a fuel bundle and an improved associated spacer. A tapered fuel rod is utilized having a large diameter bottom tube for holding corresponding large diameter fuel pellets at the fuel rod bottom, a smaller diameter top tube for holding correspondingly smaller diameter pellets at the top of the fuel rod, and a bell reducer situated between the large diameter lower fuel tube and the smaller diameter upper fuel tube. This bell reducer tapers from the large outside diameter of the lower fuel tube to the smaller outside fuel diameter of the upper fuel tube and forms a smooth transition between the large and small diameter sections of the fuel rod.

Current spacer designs can easily be adapted to the upper small diameter portion of the fuel rods, and to the lower large diameter portions of the fuel rods, resulting in one spacer design for the upper portion of the fuel bundle and a different spacer design for the lower portion of the fuel bundle.

However, a major problem arises with such a fuel bundle; the large diameter portion of the fuel rods cannot pass through the upper spacers. Current practice in fuel bundle assembly is to insert fuel rods into the bundle from the top. Insertion of fuel rods from the bottom of the bundle would greatly complicate the fuel bundle assembly. In addition, it is sometimes necessary to replace fuel rods in fuel bundle after operation in a nuclear reactor. Current practice is to remove and insert from the top of the fuel bundle. Insertion from the bottom would require major changes in reactor servicing equipment, would be a more complex procedure, and would require more time.

Improved spacer designs are disclosed which allow insertion and removal of tapered fuel rods. An improved fuel rod spacer is disclosed for use with the upper and smaller tube portions of the fuel rods. This upper spacer defines a matrix of rod holding positions having sufficient dimension for enabling both the upper smaller diameter tube and the lower large diameter tube to pass through the cells defined for each fuel rod. A spring having a relatively wide flexure range protrudes into each cell. When the fuel bundle is conventionally assembled, the spring in each cell biases the upper smaller diameter tubes in their deigned side-by-side relation against stops defined at each cell. At the same time, the spring is provided with sufficient flexibility to allow the lower large diameter tube and the transition bell reducer to pass through the individual cells of the upper spacer. With the improved upper spacer, a fuel rod can be lifted vertically upward and out of the fuel bundle or replaced vertically downward into the fuel bundle.

In the upper spacers the stops are smaller than in a conventional spacer. The reduced stop dimension provides additional space in the cell, allowing the larger diameter portion of the fuel rod to pass through. In the assembled condition with the small diameter portion of the fuel rod in the cell, and with the fuel rod biased against the stops by the spring, the fuel rod is off-center with respect to the cell. All of the cells and stops in the spacer have the same orientation, so that a uniform array of fuel rods results.

Two embodiments are disclosed for the lower spacers. In the preferred embodiment, the cells are identical to those of the upper spacers. When the large diameter portion of the fuel rod is biased against these stops, the fuel rod is off-center with respect to the cell, in the direction opposite to that of the upper portion of the fuel rod in the upper spacers. All of the cells and stops of the lower spacers have the same orientation, resulting in a uniform array of fuel rods.

In an alternate embodiment, the stop dimensions are different from those of the upper spacers, and are chosen to center the fuel rods in the cells. There results a fuel bundle which has a uniform distribution of fuel and coolant with resultant uniform critical power response, no regions of non uniform vapor flow, and improved flow area in the upper two phase region of the bundle.

OTHER OBJECTS, FEATURES AND ADVANTAGES

An object of this invention is to disclose a practical design for a fuel bundle utilizing an array of vertically upstanding tapered fuel rods. The prior art suggested concept of a tapered fuel rod is provided with an upper smaller diameter portion, a lower larger diameter portion, and a reducer providing a smooth transition there between. An improved spacer is disclosed. The spacer—like all prior art spacers—defines a plurality of individual cells with stops for the bias of the fuel rods to a designed limit of side-by-side spacing. The spacer—unlike all prior art spacers—has special characteristics allowing the removal and replacement of the tapered fuel rods from the top of the fuel bundle. Accordingly, each cell of the spacers in the upper portion of the fuel bundle is of sufficient dimension to permit withdrawal of the lower large diameter portion of the fuel rods. At the same time, springs within each of the cells of the upper spacers have two discrete design functions. In the first design function, the springs act to bias the upper smaller diameter portions of the fuel rods to their designed side-by-side spacing. In a second design function, the springs deflect sufficiently to permit serial passage of the reducer and large diameter portion of the fuel rod.

An advantage of the disclosed fuel bundle and improved spacer is that the fuel bundle thus permits conventional removal and replacement of the individual fuel rods from the top of the fuel bundle without requiring inversion of the fuel bundle.

A further object of the invention is to disclose a cell arrangement which preserves a uniform rod to rod spacing while each fuel rod center is offset from the center of the cell surrounding it. In this arrangement of cells the orientation of spring and stops is the same in all cells. The direction and magnitude of the fuel rod center displacement relative to the cell center is the same for all cells. In this arrangement each spring can act on only one fuel rod. The prior art for ferrule spacers where one spring acts on two adjacent fuel rods cannot be used.

A further object of this invention is to disclose a spacer format for maintaining both the upper and lower portions of the tapered rods in perfect verticality. According to this aspect of the invention, the orientation of the cell stops and springs is the same in the upper and in the lower spacers. In the upper spacers all the fuel rods are displaced relative to the cells by a constant amount, and are displaced in the same direction. There is a uniform array of cell centers and a uniform array of rod centers, and the rod array is offset relative to the cell array. In one embodiment of the lower spacers, the cell center array is coincident with the array of fuel rod centers. In another embodiment, the arrays are offset.

In current practice the spacer is located in the bundle channel, and is centered in the channel. If this practice were followed with the spacers disclosed here, the fuel rod centers in the upper spacers would be offset relative to the fuel rod centers in the lower spacers. In the invention disclosed here, the upper and lower spacers are offset from their centered positions so the array of fuel rod centers is centered in the channel.

In either embodiment, the cells on the lower spacers are offset with respect to the cells of the upper spacers so that the centers of the upper portions of the fuel rods lie directly above the centers of the lower portions of the fuel rods. There results a spacer system that maintains top to bottom designed verticality of the tapered rods within the fuel bundle.

An advantage of this aspect of the invention is that the disclosed spacer displacement scheme can be utilized for all spacer designs having cell stops identically arrayed. Accordingly, the disclosed scheme will work with either spacers having Zircaloy ferrules or lighter Inconel grids.

Other objects, features and advantages of this invention will become more apparent after referring to the following specification and attached drawings in which:

FIG. 1A is a perspective view in partial section of a fuel bundle having a cluster of contained fuel rods with relatively large diameter bottom portions, and small diameter top portions, the fuel rods being conventionally placed in a fuel bundle having upper and lower tie plates with a surrounding channel for confining fluid flow within the channel around the cluster of fuel rods between the tie plates for the generation of steam;

Figure 5B:
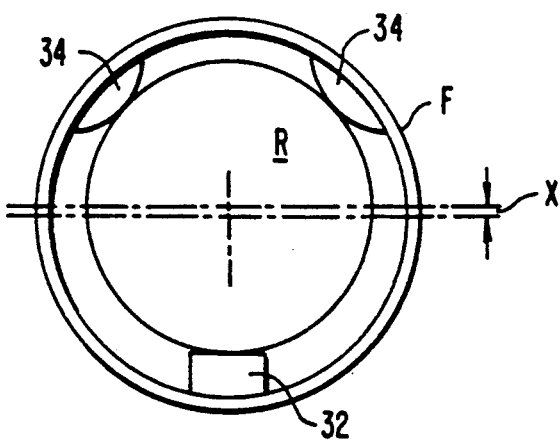
Figure 5A:
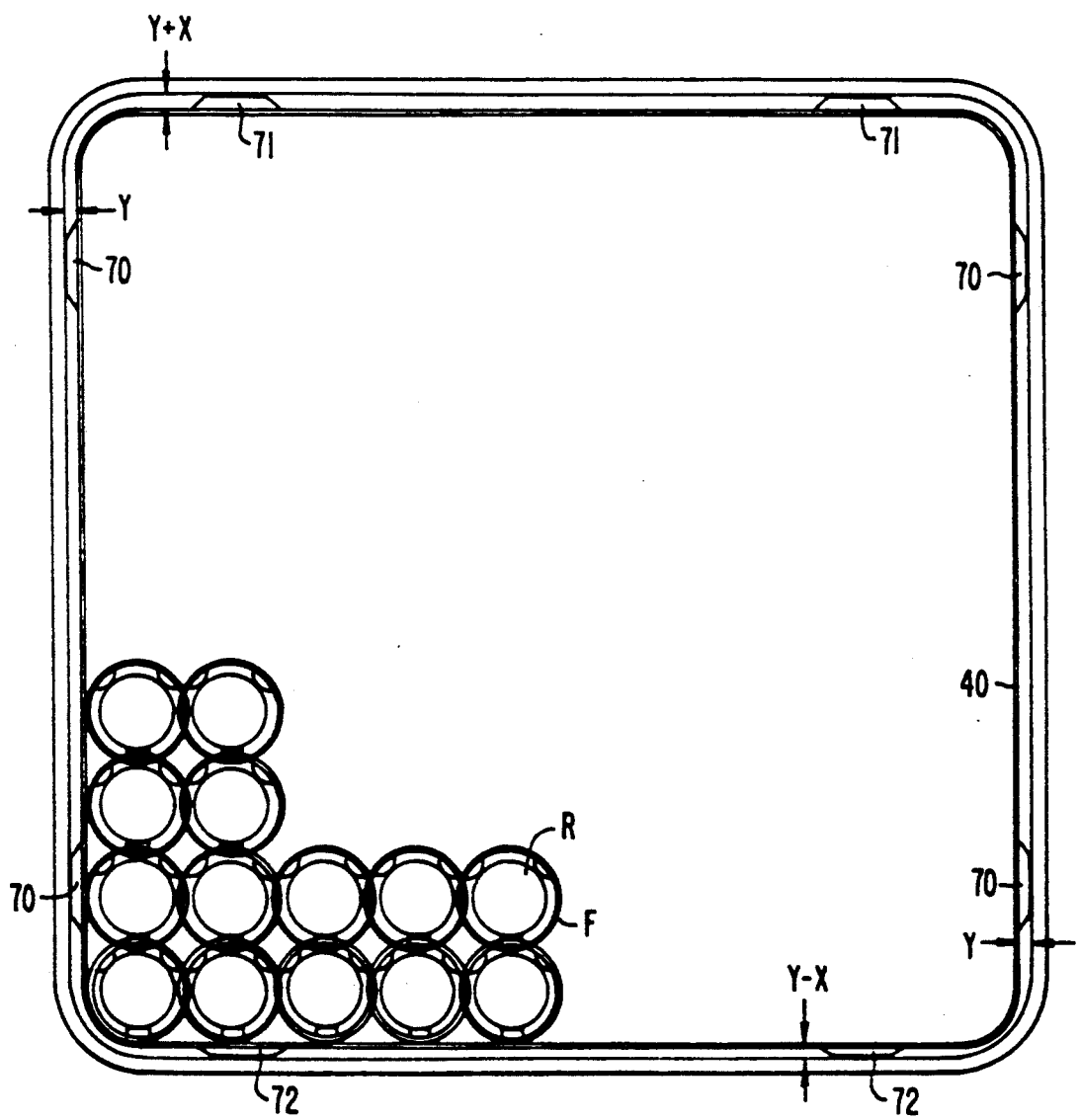
Figure 6B:
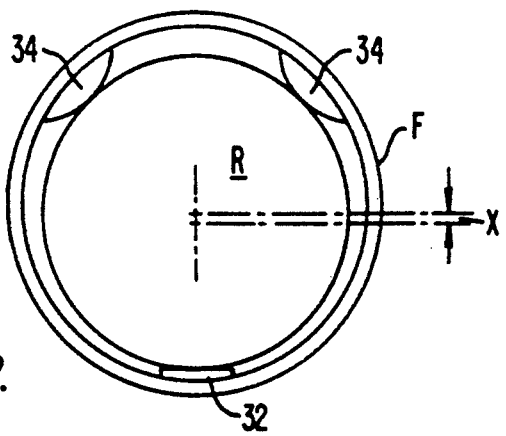
Figure 6A:
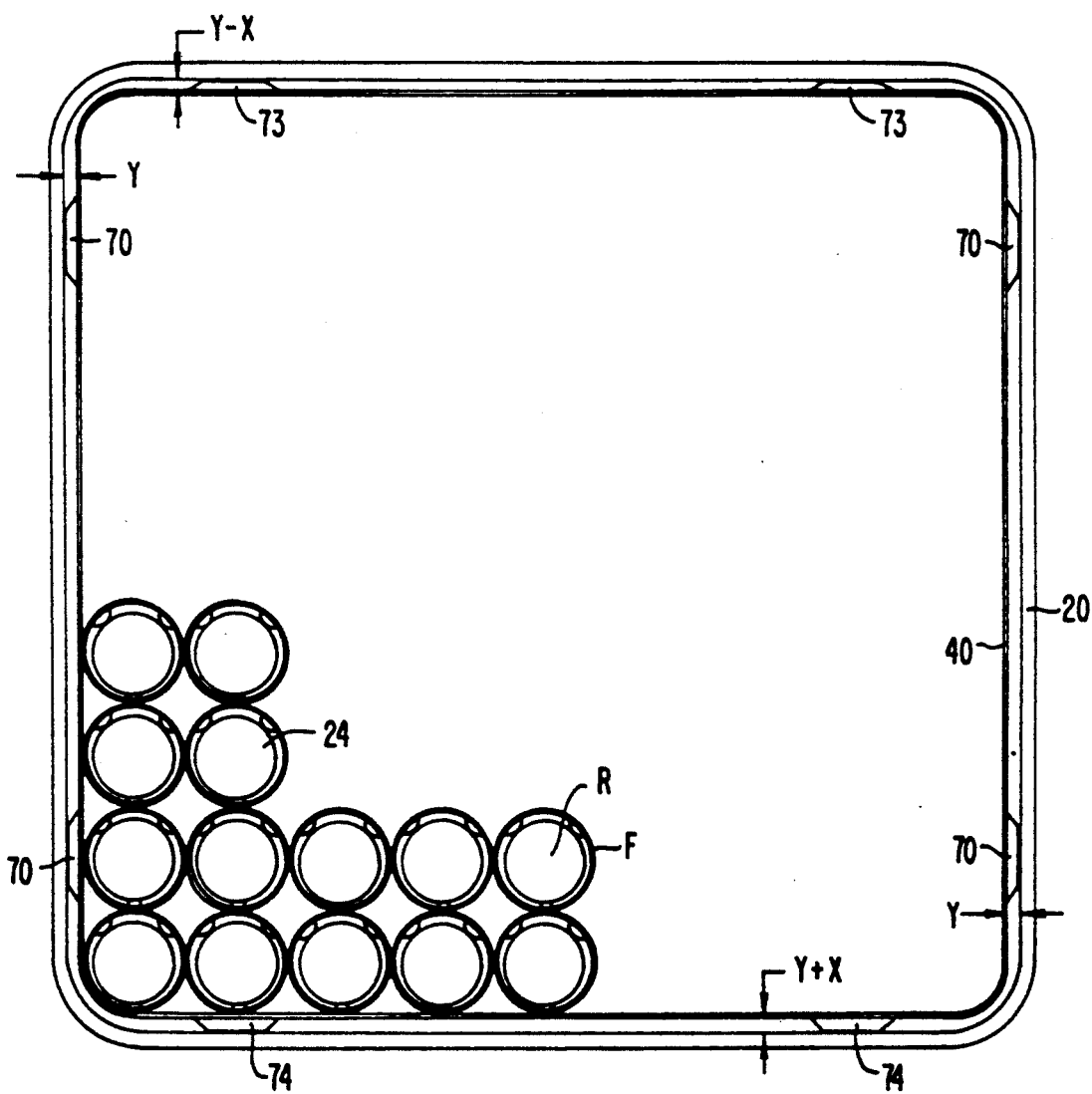
Figure 7B:
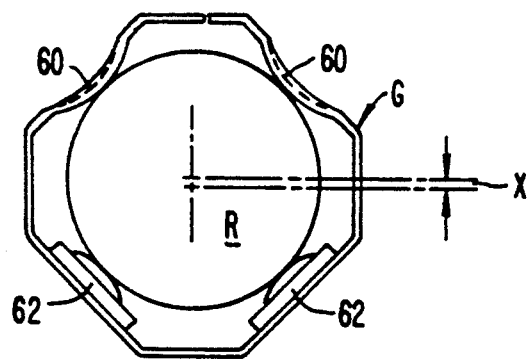
Figure 7A:
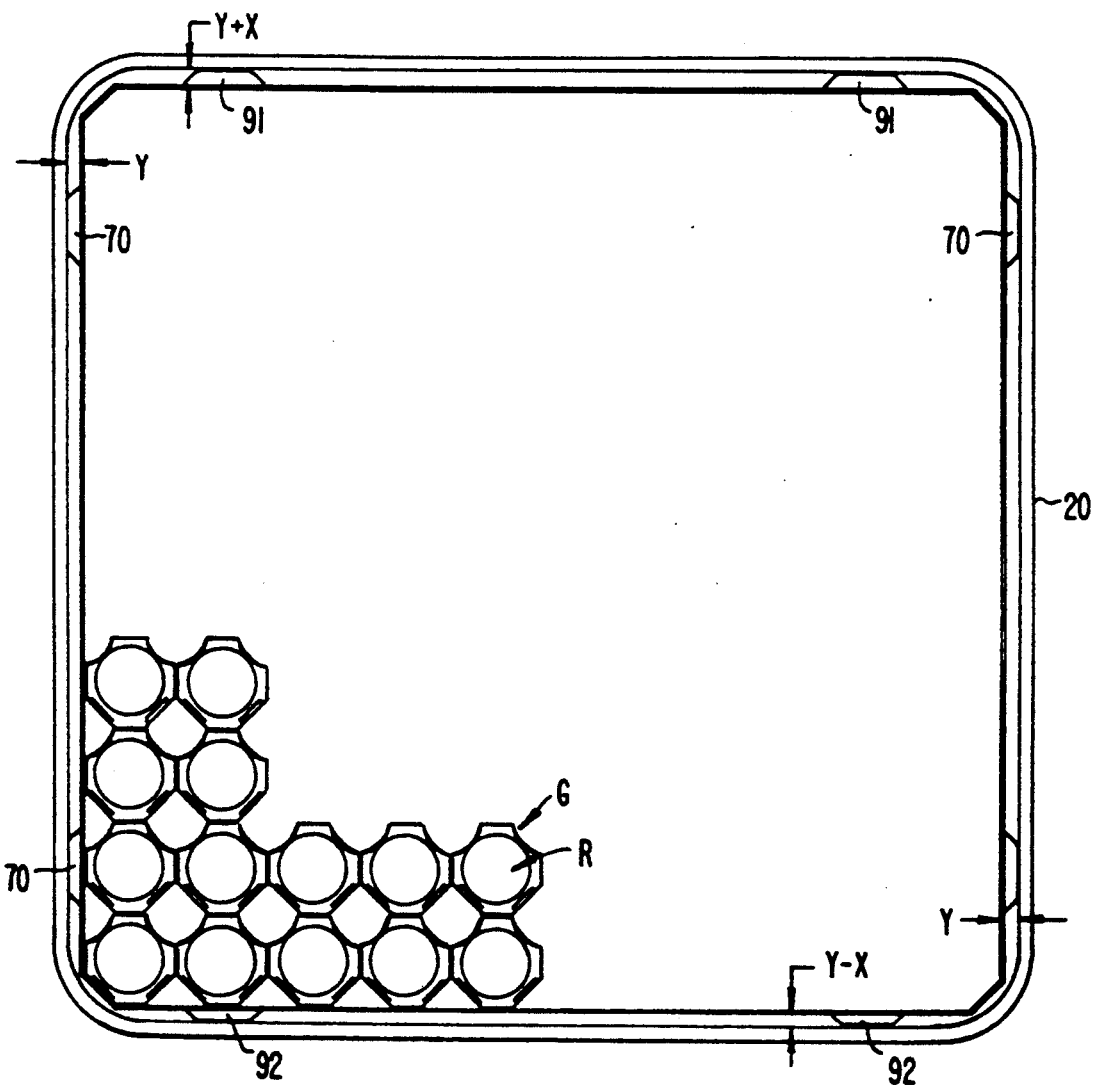
Figure 8B:
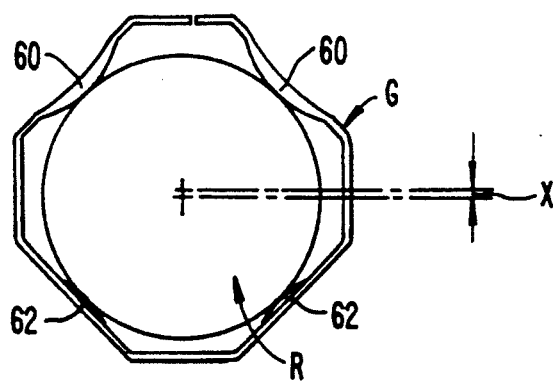
Figure 8A:
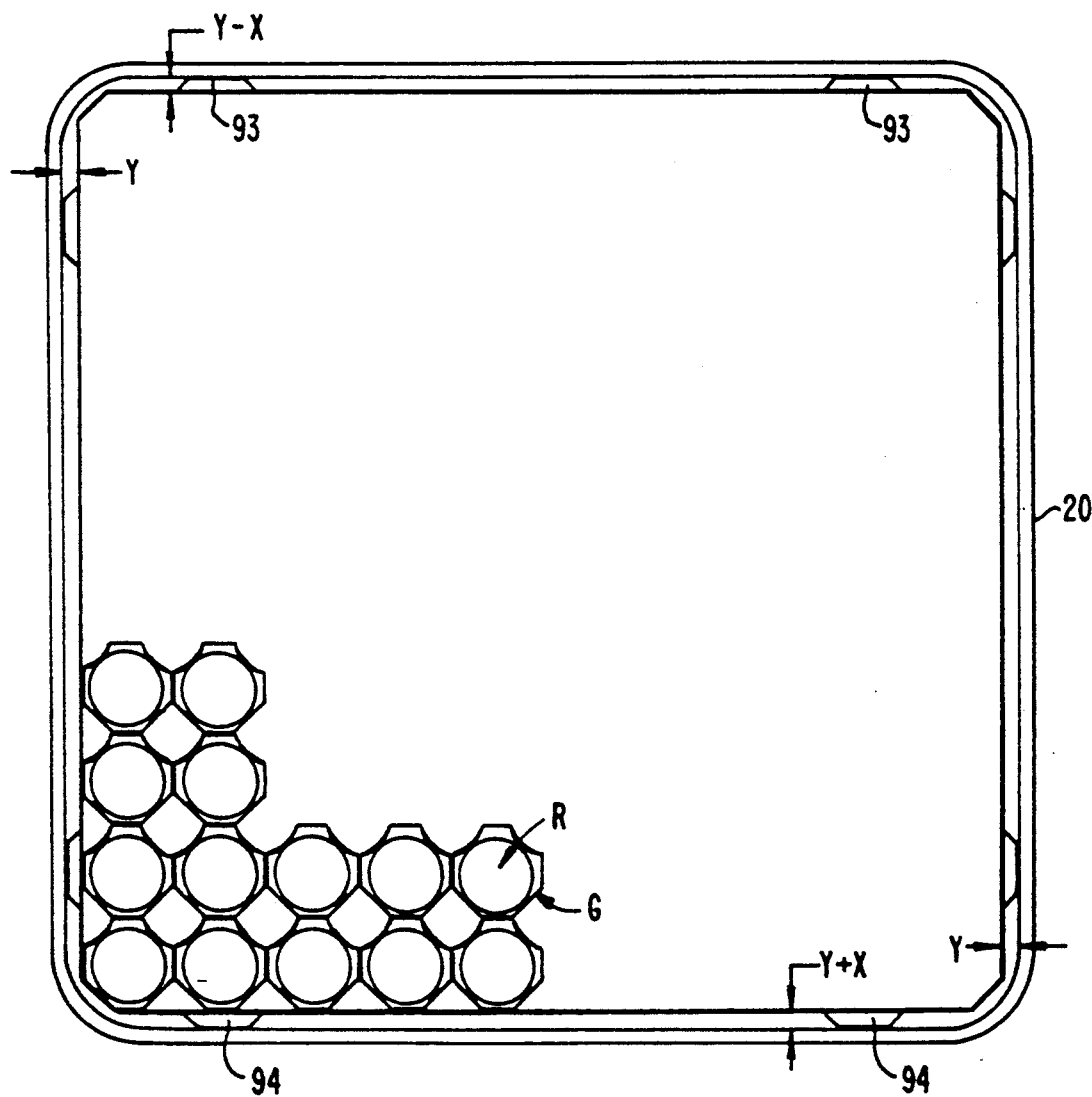
Figure 9B:
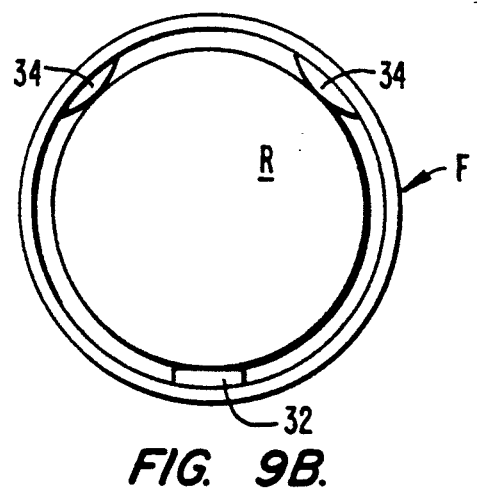
Figure 9A:
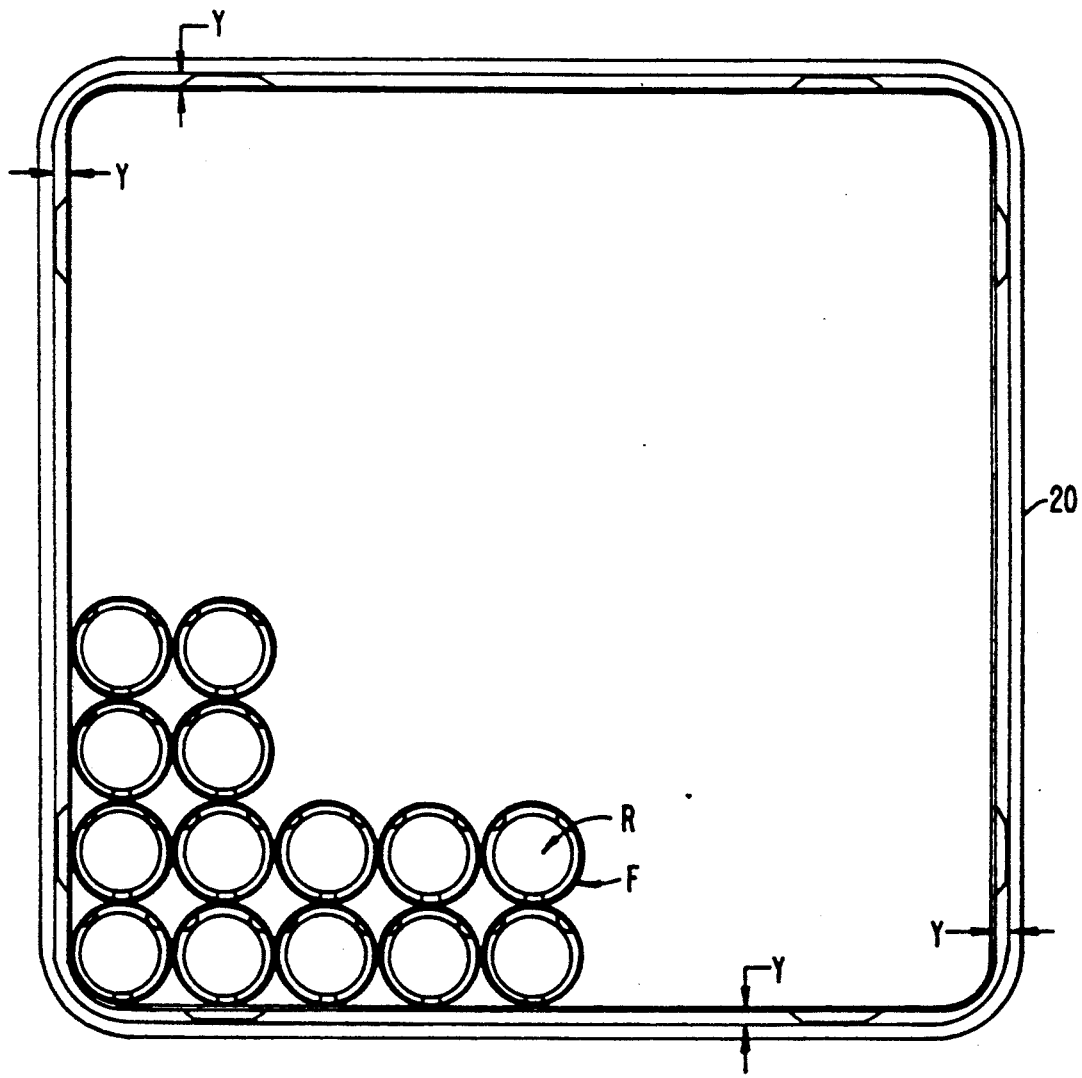
Figure 10B:
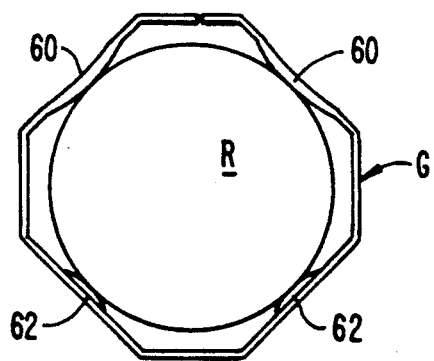
Figure 10A:
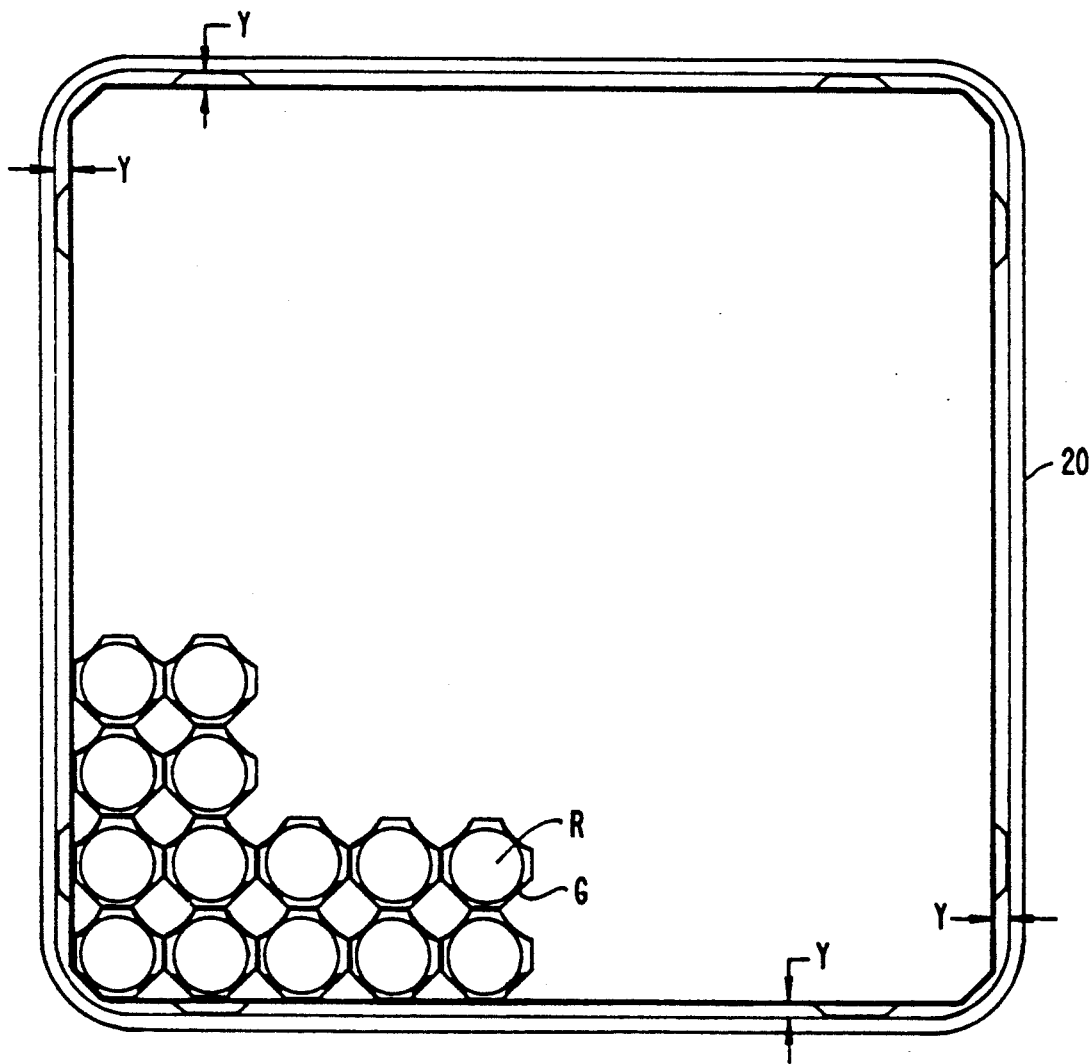

FIGS. 5A and 6A are respective portions of upper and lower spacers in a 9 by 9 array illustrating on a relative basis the displacement with respect to the channel with FIGS. 5B and 6B being expanded views illustrating the offset of the ferrule center relative to the fuel rod center; and, FIGS. 7A and 8A are respective portions of upper and lower spacers in a 10 by 10 array with an Inconel grid structure with FIGS. 7B and 8B being expanded views illustrating the relative offset of the cell center relative to the fuel rod center; and FIGS. 9A and 10A show an alternate embodiment of the lower spacers for a 9 by 9 and a 10 by 10 array, respectively, with FIGS. 9B and 10B being expanded views illustrating the offset of the cell center relative to the fuel rod center.

DESCRIPTION OF THE PREFERRED EMBODIMENT

Figures 1A, 1B:
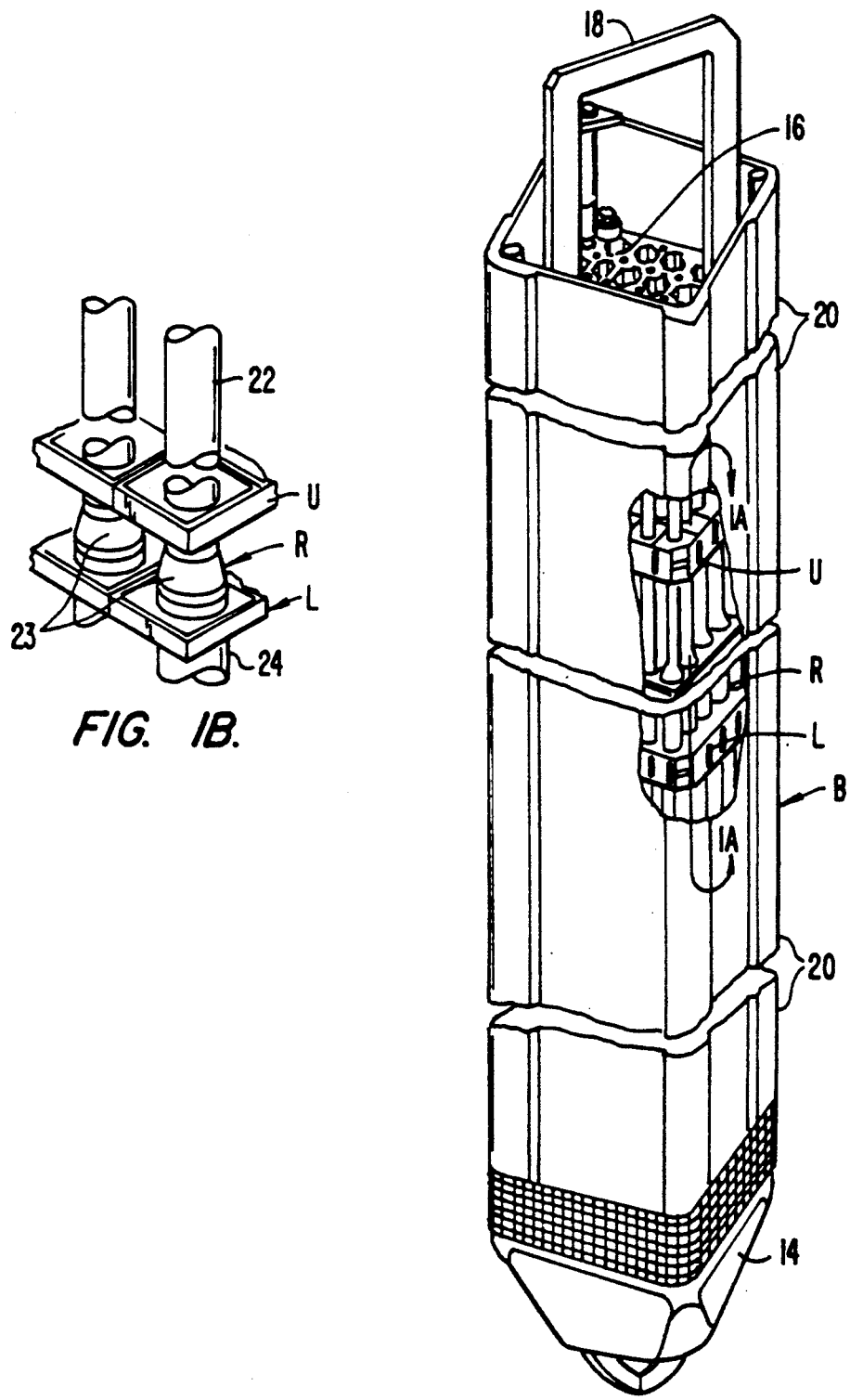
FIG. 1B is an enlarged detail of the middle portion of the fuel bundle showing the transition section of several fuel rods from their larger diameter bottom section to the smaller diameter upper section and illustrating with particularity a spacer overlying the transition bracing the upper smaller diameter fuel rods in their designed side-by-side relation.

Referring to FIG. 1A, a fuel bundle of this invention is illustrated. The fuel bundle includes a lower tie plate 14, an upper tie plate 16 and a handle 18 for manipulating the bundle. As is common in the prior art, a channel 20 extends between the upper and lower tie plates and surrounds a group of fuel rods R. Fuel rods R are typically arrayed in rows and columns. By way of example, the arrays can includes matrices of rods from 7 by 7 to 12 by 12 arrays. Indeed, the preferred embodiment includes in FIGS. 5 and 6, a 9 by 9 array and in FIGS. 7 and 8, a 10 by 10 array.

Following the suggestion of the prior art, a detailed construction of the fuel rods at their points of transition can be best seen with respect to FIG. 1B, a section taken at the point of transition between fuel rods having larger, bottom diameter fuel tubes and upper smaller diameter fuel tubes.

Those having skill in the art will realize that rods R are sealed top and bottom. Bottom tubes 24 contain a column of relatively large diameter pellets. Top tube 22 contains a column of smaller diameter pellets. Reducers 23 form a smooth surface lacking discontinuities for transition between the large diameter tubes 24 and the smaller diameter tubes 22.

Referring further to FIG. 1B, a lower spacer L is illustrated. Lower spacer L is shown schematically functioning to keep the large diameter tubes 24 spaced apart, one from another and from the channel structure 20. Upper smaller diameter tubes 22 are shown with a spacer U. It is the function of spacer U to keep the smaller diameter tubes spaced apart one from another and from the channel 20.

As will hereinafter be seen, upper spacers U and lower spacers L constitute an array of ferrules (illustrated in FIGS. 2A-2B, 3) or alternately an Inconel grid structure (illustrated in FIG. 4). In either case, a problem at the spacers is created by the tapered rods R.

Simply stated, it is from time to time necessary in the life span of a fuel bundle B to remove, inspect and/or replace fuel rods R. Such removal requires partial disassembly of the fuel bundle including removal of upper tie plate 16 and handle 18. Thereafter, the rods are lifted upwardly from the fuel bundle array. In such lifting, it can be seen that upper spacers U have a dual function.

First, the springs in the upper spacer U must be sufficiently resilient to bias the smaller diameter fuel tubes 22 against stops in the spacer. Secondly, the spacers must permit the larger diameter rods 24 to be removed.

It will be appreciated that fuel bundle B could be inverted for the removal, inspection and/or replacement of fuel rods. Lower tie plate 14 could be removed followed by all fuel rods being withdrawn in an ordinary fashion from the bottom of the fuel bundle. It is the purpose of this invention to obviate the necessity of such inversion during fuel rod removal.

Figure 2A:
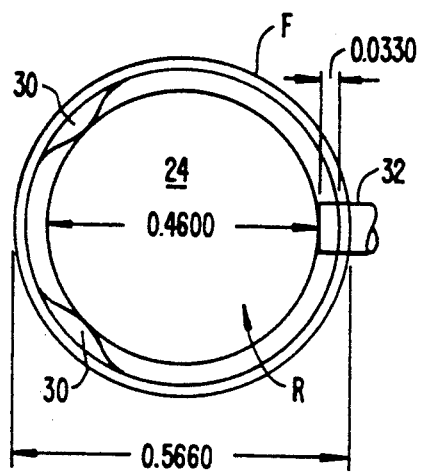
FIGS. 2A–2D are dimensional studies illustrating the difficulties in sizing spacer cells (here shown as Zircaloy ferrules) for receiving both smaller diameter tubes and larger diameter tubes in a tapered rod.
Figure 2B:
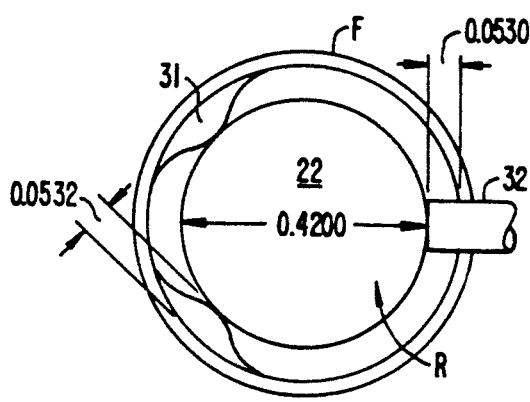

Referring to FIGS. 2A-2B, a dimensional analysis with respect to round ferrules F is illustrated. Referring to FIG. 2A, a ferrule F having a nominal thickness of 0.020 is shown containing a fuel rod having a diameter of 0.460 inches. The rod illustrated is shown at large tube 24. A uniform clearance of 0.033 is shown. As is common in the art, ferrule F is provided with stops 30 and a spring 32 which biases rod 24 into the stops. Uniform matrix spacing of the large diameter portion 24 of the fuel rod R occurs.

With respect to FIG. 2B, a ferrule F is illustrated having larger stops 31. Larger stops 31 are configured so as top center a 0.420 inch diameter fuel rod R at smaller diameter portion 22. Such biasing occurs via a spring 32 and results in a 0.053 inch clearance uniformly around the ferrule.

Figure 2C:
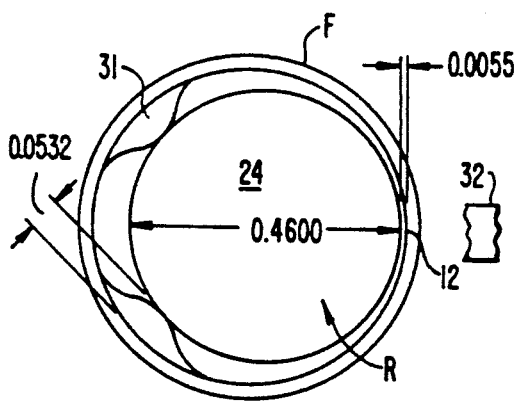

Referring to FIG. 2C, the ferrule F of FIG. 2B is shown with the large diameter tube 24 placed within it. Specifically, the large diameter tube (which is 0.460 inches in diameter) ends up with only 0.0055 inches of clearance with respect to the ferrule F. Furthermore, those having skill in the art can understand that there is virtually no space available for spring 32.

As a practical matter, the design of FIG. 2C is not feasible. Given manufacturing tolerances, both directed to the ferrule F, stops 31 and the diameter of the fuel rod R at the large fuel diameter tube 24, it would be expected by those having skill in the art that interfering contact would occur with such an arrangement.

Figure 2D:
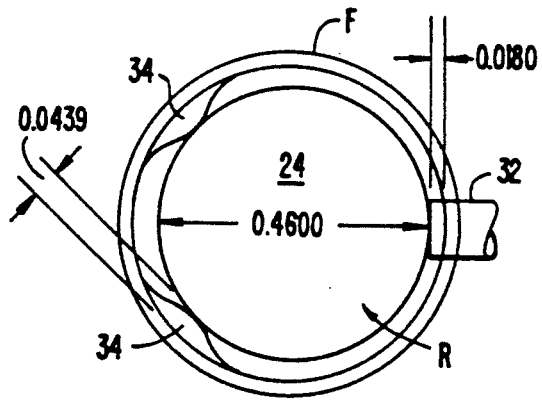

Finally referring to FIG. 2D, a compromise is illustrated. Stops 34 having a 0.0439 inch radial dimension are illustrated with respect to rod R at larger diameter portion 24. Adjacent spring 32 it can be seen that a clearance of 0.0180 inches in clearance is allowed. Removal of a large diameter rod portion 24 from such a ferrule is practicable against the bias of spring 32.

The question then becomes what net effect does a ferrule having the dimensions of 2D have with respect to the larger diameter rod portions 24 and the smaller diameter rod portions 22. This is illustrated with respect to FIG. 3.

Figure 3:
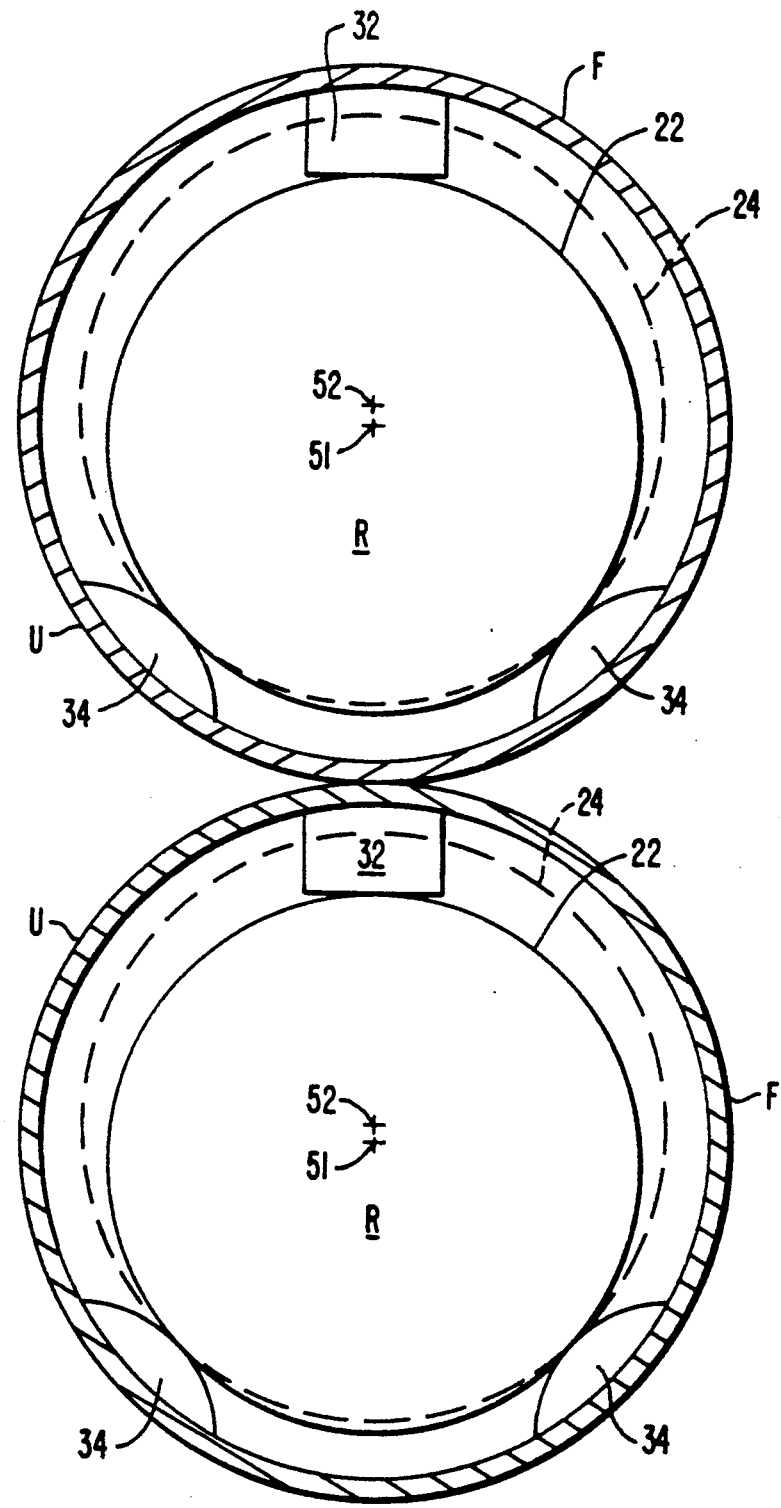
FIG. 3 is an enlarged view of two Zircaloy ferrules illustrating the nonuniform displacement present when small diameter rods and large diameter rods are placed within the ferrule construction illustrated in FIG. 2D.

Referring to FIG. 3, 2 side-by-side ferrules F are illustrated. It will be seen that the orientation of the spring and stops is the same in the two ferrules. Specifically referring to upper ferrule F, it can be seen that stops 34 are at the top. Referring to lower ferrule F, stops 34 are identically and symmetrically placed with respect to the top.

This orientation is used for all the spacer cells in the preferred embodiment of this invention.

In the preferred embodiment, the upper and lower spacer cells are identical. In FIG. 3 the small diameter portion of the fuel rods in the upper spacers are shown as continuous lines. The large diameter portions of the fuel rods in the lower spacers are shown as dashed lines. When the lower large diameter portion of a fuel rod is inserted or withdrawn through the upper spacers, its position is also shown by the dashed lines.

It is known that ferrule F surrounding fuel rods can have beneficial flow effects as to passing coolant. Specifically, the ferrules F can function to channel water to flow against the outside surface of the fuel rods R so that boiling within the fuel bundle optimally occurs. The design clearances illustrated in FIG. 2D will produce this desirable effect.

Figure 4:
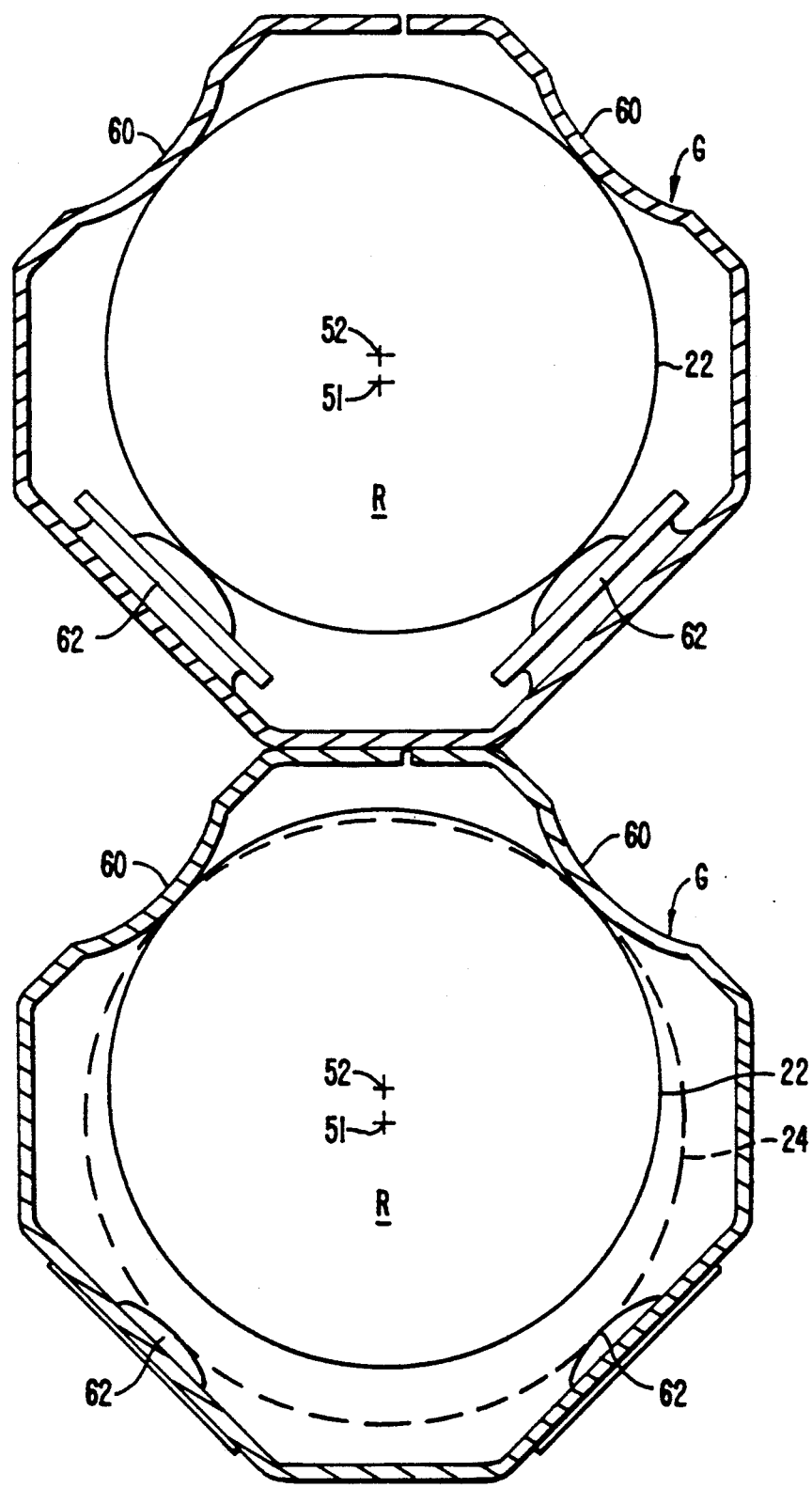
FIG. 4 is an enlarged view of two Inconel cells illustrating the nonuniform displacement when small diameter rods and large diameter rods are placed within the construction.

Referring to FIG. 4, an Inconel grid-type spacer G is illustrated. The Inconel grid spacer G includes stops 60 and spring portions 62. In the upper grid G, rod R at small diameter portion 22 is shown biased by spring 62 against stops 60. In FIG. 4, at the lower grid G, large diameter rod R at large tube 24 is schematically shown at broken lines 24. The necessary movement of springs 62 to permit passage of such a rod is illustrated. Again, offset of the centers of the rods at the large diameter tube 22 and small diameter tube 24 is illustrated. As before, it can be seen that the respective centers 51, 52 of the large diameter rod portion and small diameter rod portion 22 are offset, one with respect to the other.

Referring to FIGS. 5A and 6A the solution is illustrated for a spacer consisting of circular ferrules. FIG. 5A illustrates the upper spacers, and FIG. 6A the lower spacers. The channel cross section 20 is the same for both locations. The spacer band 40 is shown together with some of the ferrules. An enlarged view of a ferrule and fuel rod is also shown in FIGS. 5B and 6B illustrating the offset X of the ferrule center relative to the fuel rod center in each case.

For both the lower and upper spacers, the array of fuel rods is centered in the channel. The centers of the upper small diameter part of the fuel rods are directly above the centers of the lower large diameter part of the fuel rods. Because the fuel rod centers are offset relative to the spacer cells, the spacers must be offset with respect to the channel.

The spacers are located in the channel by spacer band stops 70, 71, 72. Since the relative displacement of rod centers an cell centers is in the vertical direction of the figure, stops 70 have the same height on the upper and lower spacers.

In FIG. 5A, the fuel rod diameter is small, and the ferrules are displaced downward (in the plane of the Fig.) relative to the fuel rod centers. The spacer band stops 71 at the top are larger than the stops 72 at the bottom.

In FIG. 6A, the situation is reversed for the lower spacers, and the upper band stops 73 are smaller than the lower band stops 74.

With such a scheme, the respective centers of the large diameter tubes 24 and the small diameter tubes 20 exactly overly one another.

It will be realized that this precise overlying cannot occur while a fuel rod is being withdrawn. Specifically, when the larger diameter portion 24 of rod R is in the upper spacer U, displacement of the center 51 in an upper spacer U must inevitably occur with respect to a lower spacer L. It will be remembered, however, that such rods are flexible. Specifically, and during rod removal for inspection, flexibility of the rods will accommodate the movement described herein.

Referring to FIGS. 7A and 8A, the solution for the Inconel grid-type spacer can be seen to be precisely identical.

Referring to FIGS. 7A and 8A, stops 70 on sides have equal heights for the upper and lower spacers. In FIG. 7A the upper spacer stops 91 are larger than stops 92, while on FIG. 8A the upper spacer stops 93 are smaller than stops 94. An enlarged view of a cell and fuel rod is shown for each case in FIGS. 7B and 8B respectively illustrating the offset X of the cell center relative to the fuel rod center in each case.

DESCRIPTION OF THE ALTERNATIVE EMBODIMENT

In the alternate embodiment the upper spacers are identical to those of the preferred embodiment. The lower spacers are centered in he channel, and the lower portions of the fuel rods are centered in the cells, as in the prior art. FIG. 9A shows a ferrule type spacer with the fuel rods centered in the ferrules, and FIG. 10A shows an Iconel grid spacer with the fuel rods centered in the cells. In both cases the stops on the bands are of equal size on all four sides.

What is claimed is:

1. A nuclear fuel bundle for a boiling water reactor comprising in combination:
   an array of tapered fuel rods forming the bundle array;
   a lower tie plate for supporting said tapered fuel rods and defining apertures for permitting the inflow of moderating coolant into said array of tapered fuel rods;
   an upper tie plate for maintaining said tapered fuel rods in upstanding side-by-side relation and defining apertures to permit the exit of steam and water from said array of fuel rods;
   a fuel bundle channel surrounding said fuel bundle array, said fuel bundle channel extending from said lower tie plate and to said upper tie plate for confining the flow path of said moderating coolant between said tie plates and around said fuel bundle array;
   each said tapered fuel rod in said fuel bundle array including,
   a large diameter bottom tube for holding corresponding large diameter fuel pellets at the fuel rod bottom;
   a smaller diameter top tube for holding correspondingly small diameter pellets at the top of the fuel rod;
   first spacers in the lower portion of said bundles for maintaining said fuel rods at said large diameter tubes within cells defined by said spacers in designed side-by-side relation, said first spacers including a cell matrix, and at least one spring for biasing said large diameter tubes within each of said cells of said cell matrix to a designed side-by-side relation;
   second spacers in the upper portion of said bundles for maintaining said fuel rods at said smaller diameter tubes within cells defined by said spacers in designed side-by-side relation, said second spacers including a cell matrix, and at least one spring for biasing said small diameter tubes within each of said cells of said cell array to a designed side-by-side relation;
   each cell of said cell matrix of said second spacer dimensioned to hold and receive said upper smaller diameter tube of said tapered fuel rod;
   each said cell matrix of said second spacer having a dimension to permit withdrawal of said larger diameter tube of said tapered fuel rod through said cell;
   spring means associated with each said second spacer cell having first and second biasing positions, said first biasing position for biasing said smaller diameter tubes of said fuel rods within said cells to their designed side-by-side relation, and said second biasing position for permitting upward withdrawal and replacement of said fuel rod from said fuel bundle with movement of said large diameter section of said fuel rod through said cell of said cell matrix of said second spacer.

2. The invention of claim 1 and wherein said upper and lower spacers at said cell matrix are of identical dimension; and,
   means for displacing at least one cell matrix of said upper spacer relative to said lower spacer to center said upper smaller diameter rods with respect to said lower larger diameter rods.

3. The invention of claim 1 and wherein said spacers at said cell matrix comprise Zircaloy ferrules.

4. The invention of claim 1 and wherein said spacers at said cell matrix comprise Inconel matrices.

5. The invention of claim 1 and wherein said upper spacer is displaced relative to said channel.

6. A spacer construction for use with nuclear fuel bundle for a boiling water reactor wherein said fuel bundle includes:
   an array of tapered fuel rods forming the bundle array;
   a lower tie plate for supporting said tapered fuel rods and defining apertures for permitting the inflow of moderating coolant into said array of tapered fuel rods;

an upper tie plate for maintaining said tapered fuel rods in upstanding side-by-side relation and defining apertures to permit the exit of steam and water from said array of fuel rods;

a fuel bundle channel surrounding said fuel bundle array, said fuel bundle channel extending from said lower tie plate and to said upper tie plate for confining the flow path of said moderating coolant between said tie plates and around said fuel bundle array;

each said tapered fuel rod in said fuel bundle array including, a large diameter bottom tube for holding corresponding large diameter fuel pellets at the fuel rod bottom;

a smaller diameter top tube for holding correspondingly small diameter pellets at the top of the fuel rod;

spacers for maintaining said tapered fuel rods in side-by-side relation with respect to said channel, the improvement to said spacers comprising in combination:

first spacers in the lower portion of said bundles for maintaining said fuel rods at said large diameter tubes of said fuel rods within cells defined by said spacers in designed side-by-side relation, said first spacers including a cell matrix, and at least one spring for biasing said large diameter tubes within said cells of said cell matrix to a designed side-by-side relation;

second spacers in the upper portion of said bundles for maintaining said fuel rods at said smaller diameter tubes of said fuel rods within cells defined by said spacers in designed side-by-side relation, said second spacers including a cell matrix, and at least one spring for biasing said large diameter tubes within said cells of said cell array to a designed side-by-side relation;

each cell of said cell matrix of said second spacer dimensioned to hold and receive said upper smaller diameter tube of said tapered fuel rods;

each said cell matrix of said second spacer having a dimension to permit withdrawal of said larger diameter tube of said tapered fuel rod through said cell;

spring means associated with each said second spacer cell having first and second biasing positions, said first biasing position for biasing said smaller diameter tubes of said fuel rods within said cells to their designed side-by-side relation, and said second biasing position for permitting upward withdrawal and replacement of said fuel rod from said fuel bundle with movement of said large diameter section of said fuel rod through said cell of said cell matrix of said second spacer.

7. The invention of claim 6 and wherein said upper and lower spacers at said cell matrix are of identical dimension; and, means for displacing said one cell matrix of said upper spacer relative to said lower cell matrix to center said upper smaller diameter rods with respect to said lower larger diameter rods.

8. The invention of claim 6 and wherein said spacers at said cell matrix comprise Zircaloy ferrules.

9. The invention of claim 6 and wherein said spacers at said cell matrix comprise Inconel matrices.

10. The invention of claim 6 and wherein said upper spacer is displaced relative to said channel.

* * * * *